United States Patent

[11] 3,550,703

[72] Inventors Erich Emil Knothe
Gottingen-Geismar;
Eckhard Billin, Gottingen; Franz Josef
Melcher, Gottingen-Nikolausberg,
Germany
[21] Appl. No. 868,122
[22] Filed Oct. 21, 1969
[45] Patented Dec. 29, 1970
[73] Assignee Sartorius-Werke G.m.b.H.
Gottingen, Germany
a limited liability company of Germany
[32] Priority Oct. 24, 1968
[33] Germany
[31] No. 1,804,819

[54] WEIGHING MACHINE WHICH GIVES A SIGNAL WHEN A SPECIFIC POSITION OF MEASURING IS EXCEEDED
8 Claims, 6 Drawing Figs.
[52] U.S. Cl. .................................................. 177/45,
177/173, 177/178
[51] Int. Cl. ...................................................... G01g 23/32,
G01g 23/36, G01g 23/16
[50] Field of Search............................................ 177/3—4,
(Allen Digest)(Digitizers B), 178, 45—48, 25,
173, 70, (Photelectric Digest)

[56] References Cited
UNITED STATES PATENTS
2,055,730  9/1936  Rees.............177/Photoelectric Digest
2,065,960  12/1936  Bauml..........177/Photoelectric Digest
2,595,803  5/1952  Molins et al. ..................  177/46
3,061,026  10/1962  Hecox et al................. 177/DigitizersB
3,130,802  4/1964  Bell .......................... 177/Allen Digest
3,193,032  7/1965  Martin..........................  177/178
3,421,594  1/1969  Hino.............177/Photoelectric Digest
3,439,760  4/1969  Allen............................  177/3

Primary Examiner—Robert S. Ward, Jr.
Attorney—Edmund M. Jaskiewicz

ABSTRACT: A weighing machine has a device which gives a signal when a specific position of measuring is exceeded.

The weighing machine has a microscale plate mounted on the measuring member, the microscale plate being formed with at least one reproducible mark. A screen and an optically enlarging projection device for projecting a section of the microscale plate on the screen are provided. At least one photocell is provided on the screen and adjustable thereon in the direction of movement of the scale image. A device is connected with the photocell for issuing a signal, whereby whenever at least one selectable tolerance limit of load is exceeded a signal is issued by said device.

PATENTED DEC 29 1970

Inventor:

3,550,703

WEIGHING MACHINE WHICH GIVES A SIGNAL WHEN A SPECIFIC POSITION OF MEASURING IS EXCEEDED

BACKGROUND OF THE INVENTION

The invention relates to a weighing machine with a device which, when at least one specific position of the measuring member (more especially the beam) is exceeded, gives a signal. A microscale plate is situated on the measuring member of the weighing machine, a section of the microscale plate being reproduced on an image surface of a screen (more especially a ground glass plate) with the aid of an optically enlarging projection system.

Such a weighing machine is, for example, known from U.S. Pat. No. 3,055,444 of CHYO. In that machine there is provided on the balance beam two contacts, which at both ends of a given field of traverse switch on a motor, which automatically switches weights in and out.

OBJECT OF THE INVENTION

The object of the present invention is to provide a weighing machine in which this principle is made applicable to tolerance weighing, namely the tolerance zone of loads that are to be weighed is to be adjustable at will. If one of the limits of the tolerance zone is exceeded, the device is to give a signal, which can be variously utilized. For example, one can indicate by an optical signal or an acoustic signal that a tolerance limit has been exceeded, or one can directly operate a sorting device. In general, a signal is to be given when each of the two tolerance limits is exceeded, but in special cases it can in fact suffice if this occurs only at the one limit.

To solve this task, the device in the weighing machine according to the invention has provided on the microscale plate at least one reproducible signal mark, and there is provided at a point near the image surface of the screen onto which the signal sign is reproducible, at least one light-electricity transformer, and in that the light-electricity transformer is arranged to be movable in the direction of movement of the scale image.

The light-electricity transformer can, for example, be a photodiode or a photoresistance or photoconductive cell. It is adjusted along the image surface of the screen in such a manner that it is operated by the image of the signal mark whenever the measuring member of the weighing machine precisely runs through the one tolerance limit.

Another object is to provide a weighing machine having a separate scale for the adjustment of the tolerance zone, which, starting from a zero value, indicates positive and negative tolerances in both directions. The use of the existing indicating scale for this purpose will in many cases be inadmissible.

A further object is to provide a weighing machine in which there is provided, parallel to the main scale, a tolerance scale divided into positive and negative quantities, whereby at least one tolerance limit indicator is arranged close to the image surface, namely arranged to be adjustable jointly with the or each light-electricity transformer in the longitudinal direction of the scale.

In this way, the user can recognize the setting of each light-electricity transformer by the position of the relevant tolerance limit indicator.

Yet another object is to provide a weighing machine in which the tolerance scale can be arranged on the microscale plate itself parallel to the main scale (and preferably at the zero end thereof) and the tolerance limit indicator can be manufactured from wire, so that the wire extends as a shadow mark into the projected beam of light. These light-electricity transformers can be adjusted to the desired tolerance limits, if the tolerance scale has previously been allowed to swing to zero.

The zero mark of the tolerance scale will, on the microscale, normally be arranged next to the zero mark on the main scale. Tolerances of any desired weights can be adjusted whenever the main scale and, with it, the tolerance scale is set at zero with the aid of a tare device. If, however, always only approximately constant weights of, for example, 50 grams are to be weighed by a specific weighing machine, the tolerance scale can then be arranged at another point in this example so that its zero mark lies next to the 50 gram mark of the main scale.

It can be advantageous for only one of the two scales to appear on the image surface. By this means, the image surface is better employed, and confusion avoided.

Another object is to provide a weighing machine in which a beam shifting member—(more especially a mirror or a prism)—can be arranged to be adjustable inside the projected beam of light in such a way that, depending on the adjustment, it causes the image of the main scale or of the tolerance scale to appear on the image surface. This measure is previously known for scales of other type.

A substantially more simple arrangement is obtained if the tolerance scale is not arranged on the microscale plate, but is arranged stationarily on the housing next to the ground glass plate and indicator marks are provided which are adjustable on the housing along the tolerance scale. No beam-shifting member is then required within the projected beam of light, as the main scale is permanently reproduced and the purpose is answered with a simpler microscale plate.

Preferably two light-electricity transformers are provided for limiting the weight tolerance zone. A transparent strip, on an opaque ground, substantially parallel to the main scale of the microscale, preferably serves as signal mark. It is sufficient to utilize a single transparent strip, even when using two light-electricity transformers. The shadow edge at one end of the strip is then decisive for the giving of the signal. It sweeps over both light-electricity transformers in succession upon a movement of the measuring member of the weighing machine. Through known "per se" electrical switching devices, one can ensure that the desired signals are emitted, according to whether the signal sign illuminates no light-electricity transformer or only one or both of them.

DETAILED DESCRIPTION OF THE APPARATUS

Figure 1:
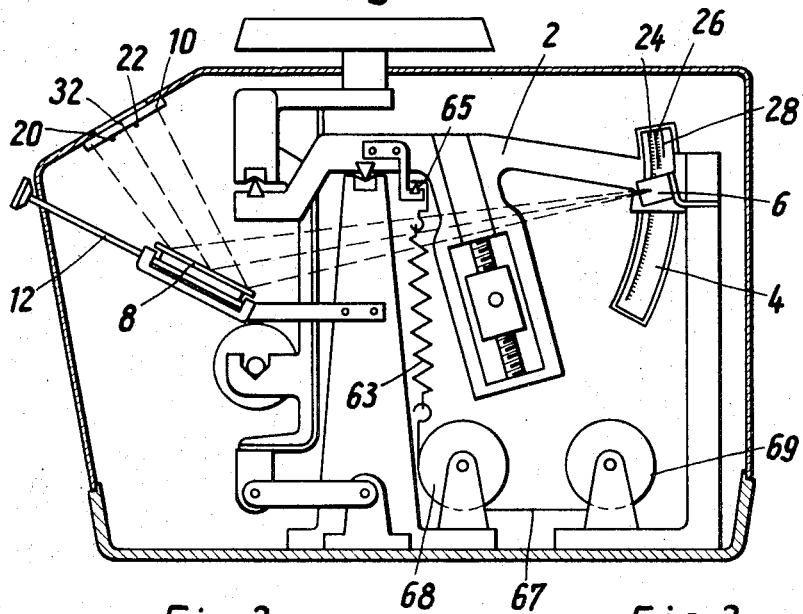
FIG. 1 shows, in diagrammatic side view, partly in section, a weighing machine with a device according to the invention.

FIG. 1 shows an upper-dish weighing machine with a balance beam 2, on the right-hand end of which the microscale plate 4 is fastened. A section of the microscale plate is reproduced onto a ground glass plate by a projection device, not visible for the most part, by way of a deviating prism 6 and a mirror 8. The mirror 8 can be swung about an axis 12, namely so that it is adjustable into two positions, in one of which it projects a section of the main scale 24, and in the other of which it projects a section of the tolerance scale 26, onto the ground glass plate 10.

The two photoelectric cells 20 and 22 are arranged close underneath the ground glass plate 10 in such a way that they are adjustable along the ground glass plate (for instance from left to right in FIG. 1).

Figure 2:
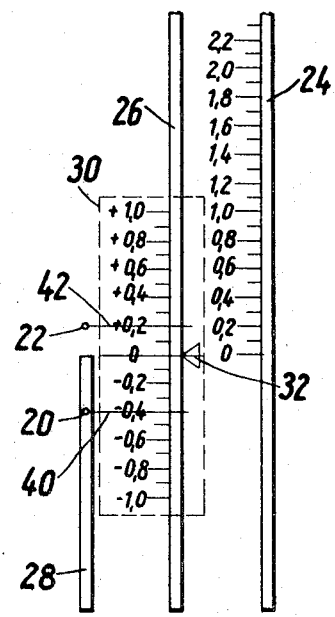
FIG. 2 shows a projected screen image of the tolerance scale, of the signal mark and of the zero end of the main scale, with both scales swung into the zero marking of the ground glass plate.
Figure 3:
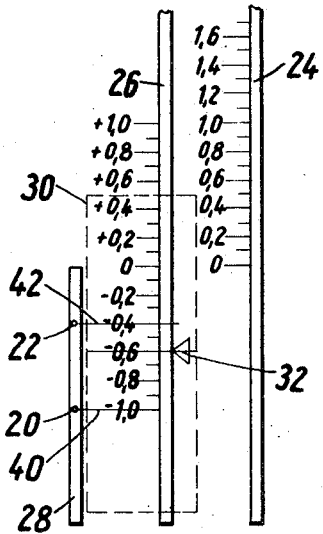
FIG. 3 shows the same illustration with a different position of the scales.

FIGS. 2 and 3 show the end, adjoining the zero mark, of the main scale 24, which extends from 0 to 100 grams. Arranged parallel to the main scale is the tolerance scale 26, which extends from 0 in opposite directions up to plus 1 gram or minus 1 gram. In other words it has respectively the length of 1 percent of the main scale. According to requirements, the length ratio can also, however, be otherwise, for example it can amount to 10 percent. Arranged parallel to both is the signal mark 28. Preferably longitudinal beams of the two scales and the signal mark are transparent parts of the microscale plate 4 in a practically opaque background. Both scales correspond with their zero marks, and the upper end of the signal mark terminates the zero marks.

Indicated in FIGS. 2 and 3 as a frame 30 with dotted lines is the bounds of the ground glass plate window. In both cases the mirror 8 is so adjusted that only the tolerance scale, or a section of it, appears on the ground glass plate.

The two photoelectric cells 20 and 22 are preferably photodiodes, since great store is placed on a rapid response. The photocells are arranged close underneath the ground glass plate and are, as shown by FIGS. 2 and 3, arranged laterally outside the bounds 30 of the ground glass plate window, namely within the path of movement of the signal mark 28. Both the photocells in FIGS. 2 and 3 can be adjusted upwards or downwards by means which are not illustrated.

Fastened to the photocell 20 is a straight wire 40, and fastened to the photocell 22 is a straight wire 42. Both wires lie beneath the ground glass plate parallel to the this latter and to the scale marks. From the front of the ground glass plate the wires can be perceived as shadow lines. They are adjusted jointly with the photocells in the direction of movement of the scale images.

As shown by FIG. 1, a tare compensator is provided, which has a tension spring 63. The upper end of the spring acts on a knife-edge 65 fastened to the balance beam. The lower end of the spring is connected to a tie rod 67, which is conducted over a stationary and pivoted roller 68 and can be wound onto an additional stationary roller 69 by parts (not shown) which are operable by hand.

If loads of about 80 grams are weighed within a tolerance range of 79.8 to 80.4 grams, the procedure is as follows: the mirror 8 is first adjusted in such a manner that a section of the main scale 24 falls onto the ground glass plate. A normal weight of 80 grams is then placed onto the scale pan and the tare compensator so operated that the zero mark of the scale 24 falls on the zero mark 32 of the ground glass plate. The mirror 8 is then adjusted in such a manner that the tolerance scale 26 is reproduced, as shown by FIG. 2. The tolerance scale is provided with appropriate (plus or minus) signs in accordance with the main scale. This now implies that the tolerance limits must be adjusted with reversed signs. The upper tolerance limit (90.4 grams in this case) is adjusted by shifting the photocell 20 with the wire 40 to −0.4 grams, and the lower limit (79.8 grams in this case) is adjusted by shifting the photocell 22 with the wire 42 to +0.2 grams.

In the case of FIG. 3, the load is 0.6 grams lighter than the theoretical nominal value of 80 grams, and thereby lies outside the tolerance zone. In this case, an appropriate signal is produced in that the two photocells 20 and 22 are optically stimulated by the signal mark 28. If, on the other hand, the weight is within the tolerance zone, then only the photocell 20 is stimulated, as also shown by FIG. 2. If the load is too heavy by more than the upper tolerance limit adjusted to −0.4, then the upper edge of the signal mark 28 remains beneath the photocell 20. Neither of the photocells is stimulated. In each of the said cases a known "per se" electric circuit ensures the emission of a signal which indicates whether the load is within the tolerance range or is too light or too heavy. Through the signals it is possible, for example, for indicator lamps of various colours to be switched on, or a sorting device can be actuated. For the actual tolerance weighings, the tolerance scale 26 or the main scale 24 as desired can be reproduced on the ground glass plate.

In order to avoid the adjustment of the tolerance limits according to reversed signs one can, in a further development of the invention, associate each wire with the relevant photocell by way of an adjustment device in such a manner that the photocell, upon the adjustment, removes as far in the one direction from the zero mark 32 of the ground glass plate as does the wire associated with it in the opposite direction. Thus, if the photocell 20 shifts downwards, then its wire 40 shifts upwards, and vice versa.

Figure 4:
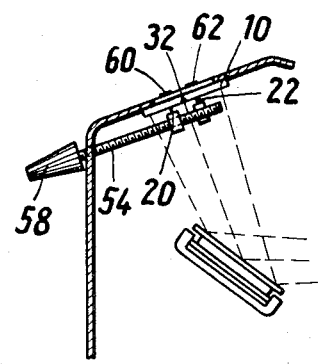
FIG. 4 shows a further exemplified embodiment in diagrammatic partial side view corresponding to FIG. 1.
Figure 5:
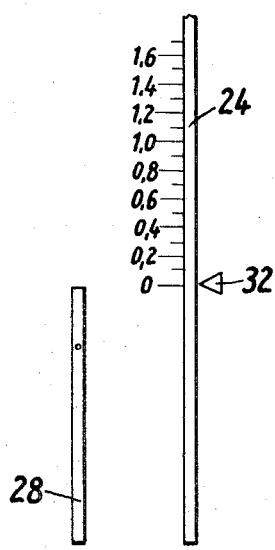
FIG. 5 shows, in correspondence with FIG. 2, a projected picture of the microscale plate for the this specific embodiment.
Figure 6:
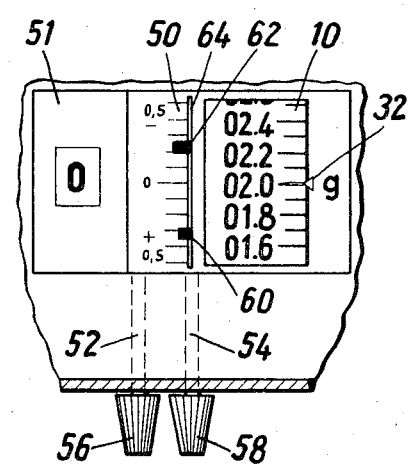
FIG. 6 is a top plan view of a portion of the weighing machine housing, with carries the ground glass plate and the tolerance scale.

In the specific embodiment according to FIGS. 4 to 6, the tolerance scale designated by 50 in FIG. 6 is situated stationarily on a cover plate 51 of the weighing machine housing next to the ground glass plate 10. The two photocells 20 and 22 can, by two screw spindles 52 and 54, be separately adjusted in the longitudinal direction of the tolerance scale, namely with the aid of hand knobs 56 and 58. Each of the photocells is arranged in a longitudinal guidance, not illustrated. The photocell 20 is securely connected to an indicator mark 60 and the photocell 22 is securely connected to an indicator mark 62. Each of the indicator marks engages through a slot 64 in the cover plate 51, and is bent over on the outside towards the left into a vane which is well perceivable.

In this case only the weight scale 24 and the signal mark 28, but not the tolerance scale, are provided on the microscale plate (FIG. 5).

I claim:

1. A weighing machine having a measuring member, a main scale, a microscale plate mounted on the measuring member, the microscale plate being provided with said main scale and at least one reproducible mark, a screen, an optically enlarging projection device for projecting a section of the microscale plate on said screen, at least one light-electricity transformer arranged close to said screen and adjustable in the direction of movement of the scale image, whereby whenever at least one selectable tolerance limit of load is exceeded a signal is issued by said transformer.

2. A weighing machine as claimed in claim 1 further comprising a tolerance scale divided according to positive and negative values provided parallel to said main scale, and at least one tolerance limit indicator arranged close to the image surface of said screen and adjustable jointly with each light-electricity transformer in the longitudinal direction of the scale, whereby, whenever at least one selectable tolerance limit of load is exceeded, a signal is issued by said transformer.

3. A weighing machine as claimed in claim 2, further comprising a housing, said tolerance scale situated next to the screen stationarily on the housing and parallel to said screen, and an indicator mark connected with each light-electricity transformer and constituting a tolerance limit indicator mark which is adjustable along the tolerance scale, and is visible from the outside.

4. A weighing machine as claimed in claim 2, further comprising a tolerance scale arranged on said microscale plate parallel to said main scale and a tolerance limit indicator connected to each light-electricity transformer and movable in the longitudinal direction of the screen.

5. A weighing machine as claimed in claim 4, further comprising a wire constituting each of the tolerance limit indicators, whereby a shadow mark is produced on said screen.

6. A weighing machine as claimed in claim 2, further comprising a setting device provided for each of the light-electricity transformers and its relevant tolerance limit indicator which makes possible an adjustment of light-electricity transformer and indicator by like lengths of path in contrary directions in relation to a zero mark of the image surface of the screen.

7. A weighing machine as claimed in claim 4, further comprising a light shifting member which is arranged to be adjustable whereby a picture detail of one of the main scale and the tolerance scale is projected on the image surface of said screen.

8. A weighing machine as claimed in claim 2, further comprising an opaque ground and a single transparent strip constituting a signal mark provided on said opaque ground and extending substantially parallel to the main scale, said at least one light-electricity transformer being two transformers.